United States Patent
Odajima

(10) Patent No.: US 7,593,836 B2
(45) Date of Patent: Sep. 22, 2009

(54) ELECTROMAGNETIC FIELD SIMULATOR AND ELECTROMAGNETIC FIELD SIMULATION PROGRAM

(75) Inventor: Wataru Odajima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 278 days.

(21) Appl. No.: 11/497,267

(22) Filed: Aug. 2, 2006

(65) Prior Publication Data

US 2007/0219762 A1 Sep. 20, 2007

(30) Foreign Application Priority Data

Mar. 17, 2006 (JP) .............................. 2006-075291

(51) Int. Cl.
*G06F 17/10* (2006.01)
(52) U.S. Cl. ............................................ 703/2; 703/17
(58) Field of Classification Search ................ 703/2, 703/6, 17; 343/741, 742; 324/300, 357
See application file for complete search history.

(56) References Cited

U.S. PATENT DOCUMENTS

| 6,218,998 | B1 * | 4/2001 | Van Voorhies | 343/741 |
| 6,239,760 | B1 * | 5/2001 | Van Voorhies | 343/742 |
| 7,257,518 | B2 * | 8/2007 | Alba | 703/2 |
| 2006/0125475 | A1 * | 6/2006 | Sodickson et al. | 324/300 |

FOREIGN PATENT DOCUMENTS

| JP | 2003-141182 | 5/2003 |
| JP | 2003-337919 | 11/2003 |

OTHER PUBLICATIONS

Nye et al., Mapping a Diffraction Field Close to an Obstacle, IEEE Tracstions on Electromagnetic Compatibility, vol. 37, No. 2, May 1995, pp. 288-292.*
Kane S. Yee, "Numerical Solution of Initial Boundary Value Problems Involving Maxwell's Equations in Isotropic Media", *IEEE Transactions on Antennas and Propagation*, vol. AP-14, No. 8, May 1966, pp. 302-307.
Toru Uno, "Analysis of electromagnetic field and antenna by FDTD method", 1998, Corona Co.
J. B. Judkins et al., "Finite-difference time domain modeling of nonperfectly conducting metallic thin-film gratings", *J. Opt. Soc. Am. A*, vol. 12, No. 9, Sep. 1995, pp. 1974-1983.

* cited by examiner

*Primary Examiner*—Russell Frejd
(74) *Attorney, Agent, or Firm*—Fujitsu Patent Center

(57) ABSTRACT

A wavelength computation unit computes a wavelength inside a substance based on the values of an analytical model that is set with an analytical model setting unit and values defining a wave source that is set by a wave source setting unit. A coefficients computation unit calculates the coefficients of a second computational formula for computing a polarization current when a grid spacing that is set by a computation conditions setting unit is equal to or larger than "1/10" of the wavelength inside the substance. When the grid spacing is less than "1/10" of the wavelength, the coefficients of a first computational formula is computed. A FDTD computation unit computes the first or second computational formula or each component of the electromagnetic field based on the FDTD method from the calculated coefficients.

14 Claims, 12 Drawing Sheets

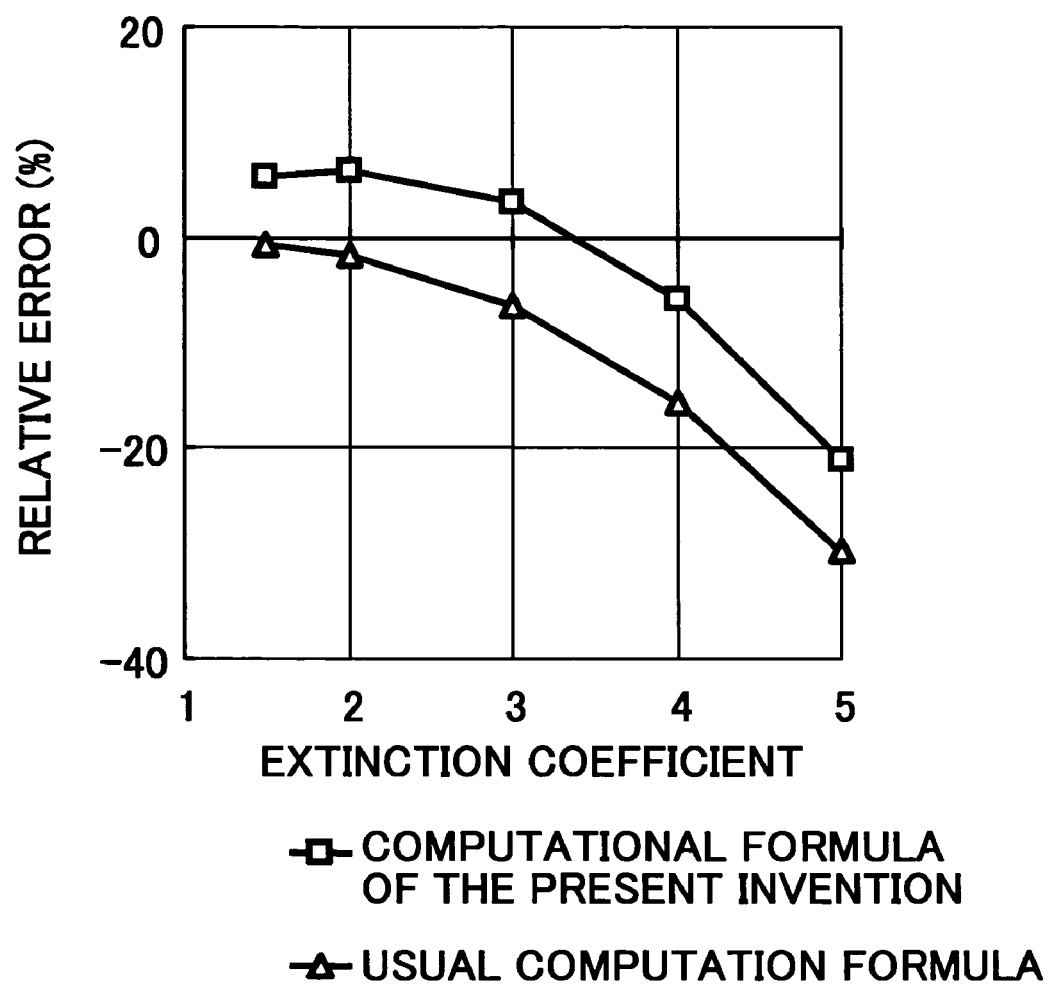

← M

← M

← M

ELECTROMAGNETIC FIELD SIMULATOR AND ELECTROMAGNETIC FIELD SIMULATION PROGRAM

CROSS-REFERENCE TO RELATED APPLICATIONS

This application is based upon and claims the benefit of priority from the prior Japanese Patent Application No. 2006-075291, filed on Mar. 17, 2006, the entire contents of which are incorporated herein by reference.

BACKGROUND OF THE INVENTION

1. Field of the Invention

The present invention relates to an electromagnetic field simulator and an electromagnetic field simulation program for conducting electromagnetic field simulation. More particularly, the present invention relates to an electromagnetic field simulator which enables the reduction of computation cost and decrease in computation error when the simulation is conducted by a FDTD method.

2. Description of the Related Art

A finite difference time domain (FDTD) method has been known as a method for electromagnetic field simulation (for example, see Yee, K. S., "Numerical solution of initial boundary value problems involving Maxwell's equations in isotropic media", IEEE Transa. Antennas Propagat., Vol.Ap-14, p. 302-307, 1966; Uno Toru, "Analysis of electromagnetic field and antenna by FDTD method", 1998, Corona Co.).

With the FDTD method, the Maxwell's equation, which is basic equation describing the change of electromagnetic field with time, is differentiated with respect to space and time to trace the changes in the electromagnetic field with time. In this case, a detailed simulation of change in electromagnetic field with time can be performed by setting a sufficiently small grid spacing (step) used for space and time discretization.

The FDTD method has the following advantages. Because the Maxwell's equation is computed directly, three-dimensional computation is simple; because the calculation of electromagnetic field in each grid is conducted by referring only to the electromagnetic field in the spatially adjacent grid, the computation principle is simple and the calculation speed is high and, therefore, parallel processing in which a analytical model is divided and computed at the same time in different computers is simple; and a time waveform in principle can be computed.

On the other hand, a technology for accessing information storage media with light has recently been developed, a near-field optics using optical element with a structure smaller than the light wavelength has attracted attention, and the analysis of light behavior in microscopic regions that are several times the light wavelength was often conducted.

In such near-field optics, the light cannot be handled as a light ray. Therefore, the light can be effectively analyzed as an electromagnetic wave with the electromagnetic field simulator using the FDTD method. A research of the near-field optics by employing such FDTD method in the optical model has been abundantly conducted.

However, if the FDTD method is used for optical analysis such as the behavior of light that irradiates a substance, problems are associated with the material constants (permittivity and electric conductivity) of the substance, by contrast with the general electromagnetic wave analysis focused on microwave, radio wave and so on.

Thus, the permittivity of the metal often has a negative value, and the problem arising when they are directly employed in the FDTD method is that the value diverges exponentially with the advancement of time steps in the computational formula.

In order to resolve this problem, the computation is conducted, for example, by handing an electric current inside a substance that is generated due to the absorption of the electromagnetic wave as a polarization current induced inside the substance (for example, Justin B. Judkins and Richard W. Ziolkowski, "Finite-difference time-domain modeling of nonperfectly conducting metallic thin-film gratings", J. Opt. Soc. Am. A Vol.12, No.9, p. 1974-1983, 1995).

However, a computational error sometimes occurs between the computations conducted by the FDTD method based on the polarization current, which is described in the reference above, and the rigorous computation.

For example, when a transmittance is computed by the FDTD method using the polarization current and when rigorous computations are conducted in the case of simulating a model in which a thin metal film is irradiated with light, the computational error increases with the increase in the grid spacing.

In order to reduce this error, the grid spacing may be sufficiently decreased, but the resultant problems are that the computation speed deceases accordingly, a large memory capacity is necessary for the computation, and the computation cost rises. On the other hand, if the grid spacing is increased, the error increases and reliability of the computation results drops, thereby making it difficult to consider the results as approximate.

In order to employ the simulation using the FDTD method for design, it is necessary to obtain the computation results that can be considered as approximate value even in the case of coarse computations with a sufficiently large grid spacing, and there is a strong demand for such computation procedure. This is because increasing the grid spacing of the analytical model in the process of obtaining approximate result and shortening the computation time leads to a significant reduction in the number of design steps.

SUMMARY OF THE INVENTION

The present invention was designed to resolve the above-described problem and it is an object thereof to provide an electromagnetic field simulation program capable of conducting analysis at a low computation cost and with a small error.

In order to attain the aforementioned object, the present invention provides an electromagnetic field simulator for repeatedly calculating a spatial distribution of an electromagnetic field at a point in time (n) by using a spatial distribution of the electromagnetic field at a previous point in time (n−1), having a computation condition setting unit which sets a time and space sampling resolutions in a simulation of the electromagnetic field, a coefficients setting unit which sets a coefficients for the electromagnetic field calculation in each position on a simulation space, and a polarization calculation unit which calculates a spatial distribution of the electromagnetic field and a spatial distribution of a polarization current inside a substance at the point in time (n) by using a spatial distribution of the electromagnetic field and a spatial distribution of the polarization current inside the substance at the previous point in time (n−1) and the coefficients, which is set by the coefficients setting unit, wherein the coefficients setting unit switches from a first computational formula used to calculate the spatial distribution of the polarization current in the polarization calculation unit to a second computational formula based on the sampling resolution of the space, which is set in the computation conditions setting unit, and the polarization calculation unit calculates the spatial distribution of the polarization current at the point in time (n) by using the second computational formula.

Furthermore, in accordance with the present invention, the above-described electromagnetic field simulator further has a wave source setting unit which sets a generation source of an electromagnetic wave to compute the spatial distribution of the electromagnetic field, wherein the polarization calculation unit switches from the first computational formula to the second computational formula based on the coefficients, which is set by the coefficients setting unit, and a wavelength of the wave source, which is set by the wave source setting unit.

Furthermore, in accordance with the present invention, in the above-described electromagnetic field simulator, the coefficients setting unit switches from the first computational formula to the second computational formula based on a value of a variable a, obtained from:

$$\frac{1}{\Delta x}\frac{\lambda}{\sqrt{|\varepsilon^*|/\varepsilon_0}} = a \qquad \text{[Formula 1]}$$

where $\epsilon^*$ stands for a complex permittivity derived from the coefficients, which is set by the coefficients setting unit, $\lambda$ stands for the wavelength, which is set by the wave source setting unit, $\Delta x$ stands for the sampling resolution of the space, and $\epsilon_0$ stands for a permittivity of vacuum.

Furthermore, in accordance with the present invention, in the above-described electromagnetic field simulator, the second computational formula is obtained by modifying a calculation method for finding an intermediate value between preceding and subsequent time steps.

Furthermore, in accordance with the present invention, in the above-described electromagnetic field simulator, the second computational formula is a computational formula using a value obtained by semi-integral step advancing the intermediate value between the preceding and subsequent time steps.

Furthermore, in accordance with the present invention, the above-described electromagnetic field simulator further has a wavelength computation unit which computes a wavelength of the electromagnetic wave inside the substance when the electromagnetic wave is transmitted through the substance, based on the wave source that is set by the wave source setting unit, wherein the polarization calculation unit switches from the first computational formula to the second computational formula when a grid spacing indicating the sampling resolution of the space that is set by the coefficients setting unit is sufficiently larger than the wavelength inside the substance, which is computed by the wavelength computation unit.

Furthermore, in accordance with the present invention, in the above-described electromagnetic field simulator, the polarization calculation unit switches from the first computational formula to the second computational formula when the grid spacing is equal to or more than "1/10" of the wavelength inside the substance.

Furthermore, in order to attain the above-described object, the present invention provides an electromagnetic field simulation program for repeatedly calculating a spatial distribution of an electromagnetic field at a point in time (n) by using a spatial distribution of the electromagnetic field at a previous point in time (n−1), the program causing a computer to execute a computation conditions setting processing which sets samplint resolutions of time and space in a simulation of an electromagnetic field, a coefficients setting processing which sets coefficients for the electromagnetic field calculation in each position on a simulation space, and a polarization calculation processing which calculates a spatial distribution of the electromagnetic field and a spatial distribution of a polarization current inside a substance at the point in time (n) by using a spatial distribution of the electromagnetic field and a spatial distribution of the polarization current inside the substance at the point in time (n−1) and the coefficients, which is set in the coefficients setting processing, wherein in the coefficients setting processing, switching from a first computational formula used to calculate the spatial distribution of the polarization current in the polarization calculation processing to a second computational formula is conducted based on the sampling resolution of the space, which is set in the computation conditions setting processing, and in the polarization calculation processing, calculating the spatial distribution of the polarization current at the point in time (n) is conducted by using the second computational formula.

In accordance with the present invention, it is possible to provide an electromagnetic field simulator and an electromagnetic field simulation program capable of conducting analysis at a low computation cost and with a small error.

BRIEF DESCRIPTION OF THE DRAWINGS

FIG. 8 shows an example of analysis results;

DESCRIPTION OF THE PREFERRED EMBODIMENTS

The best mode for carrying out the present invention will be explained below with reference to drawings.

Figure 1:
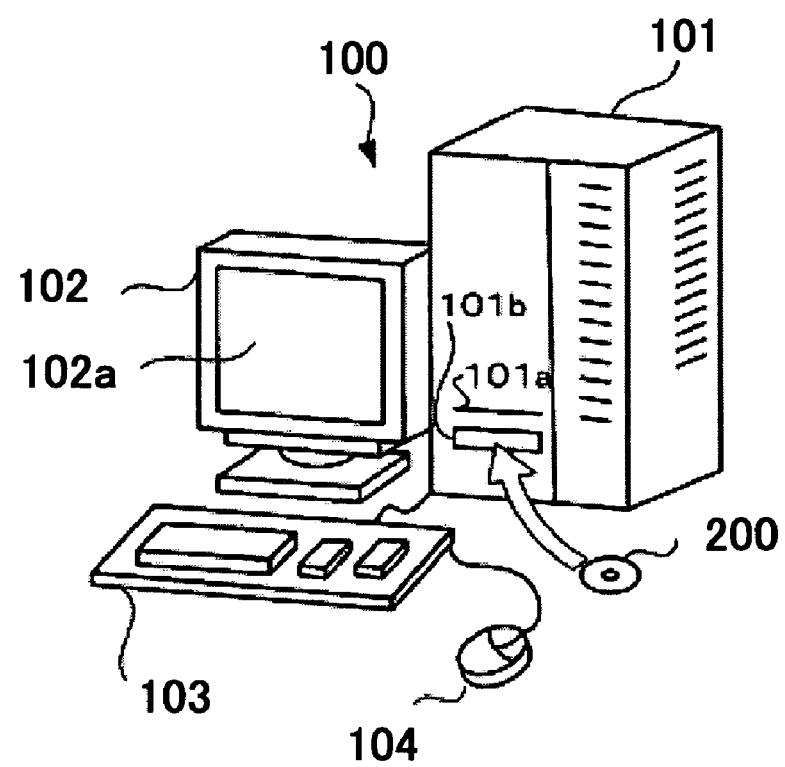
FIG. 1 is a perspective view illustrating the external appearance of the computer employed in the embodiment of the present invention.

FIG. 1 is a general perspective view of a computer employing the present invention. A computer 100 has a main unit 101, a display unit 102, a keyboard 103, and a mouse 104.

The main unit 101 has a CPU, a RAM memory, and a hard disk inside thereof. The main unit 101 has a FD insertion port 101a for inserting a flexible disk (FD) and a CD-ROM insertion port 101b for inserting a CD-ROM 200.

The display unit 102 displays on a fluorescent screen (or liquid-crystal screen) 102a as indicated from the main unit 101. The keyboard 103 serves to input the user's instructions or text information into the computer 100. The mouse 104 designates any position on the fluorescent screen 102a and inputs the instructions corresponding to the designated position.

In the present embodiment, an electromagnetic field simulation program is stored in the CD-ROM 200. The CD-ROM 200 is inserted from the CD-ROM insertion port 101b, and the electromagnetic field simulation program stored on the CD-ROM 200 is installed on the hard disk located inside the main unit 101. If the electromagnetic field simulation program is then started, the computer 100 functions as an electromagnetic field simulation.

Figure 2:
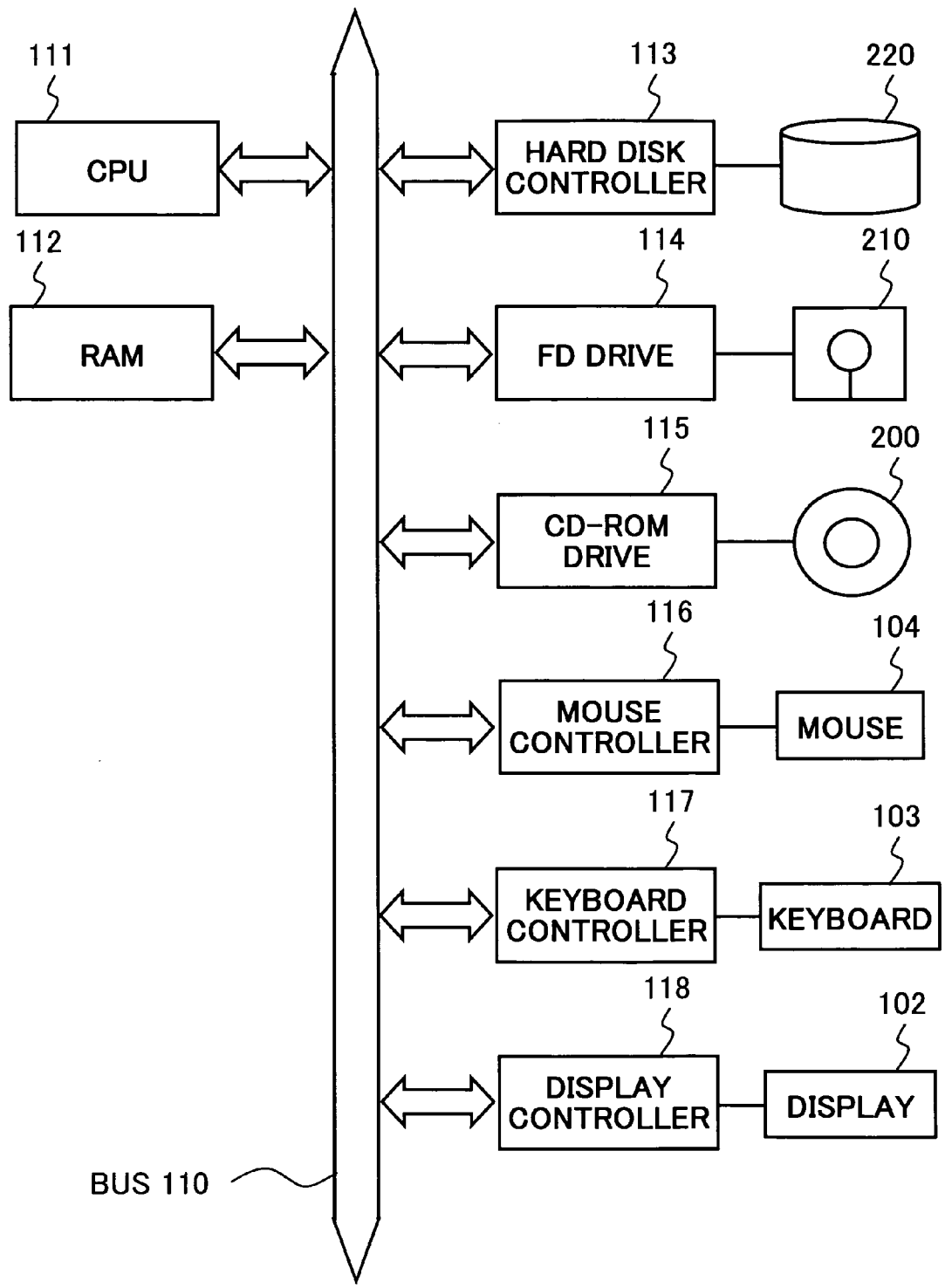
FIG. 2 shows an example of a hardware structural diagram of the computer.

FIG. 2 shows a hardware structure of the computer 100. The computer 100 has a CPU 111, a RAM 112, a hard disk controller 113, a FD drive 114, a CD-ROM drive 115, a mouse controller 116, a keyboard controller 117, and a display controller 118, those components being connected via a bus 110.

The CPU 111 executes the electromagnetic field simulation program of the present embodiment and a variety of other programs.

The RAM 112 is a working memory of the CPU 111 and serves to load temporarily the electromagnetic field simulation program installed in the hard disk 220. The CPU 111 reads the electromagnetic field simulation program from the RAM 112 and executes the program.

The hard disk controller 113 serves to control the access to the hard disk 220. The FD drive 114 controls the access to the FD 210 inserted through the FD insertion port 101a, and the CD-ROM drive 115 controls the access to the CD-ROM 200 inserted through the CD-ROM insertion port 101b.

Furthermore, the mouse controller 116 controls the mouse 104, the keyboard controller 117 controls the keyboard 103, and the display controller 118 controls the display unit 102.

The display controller 113 and so on controls the hard disk 220 and so on based on the control signal from the CPU 111.

Figure 3:
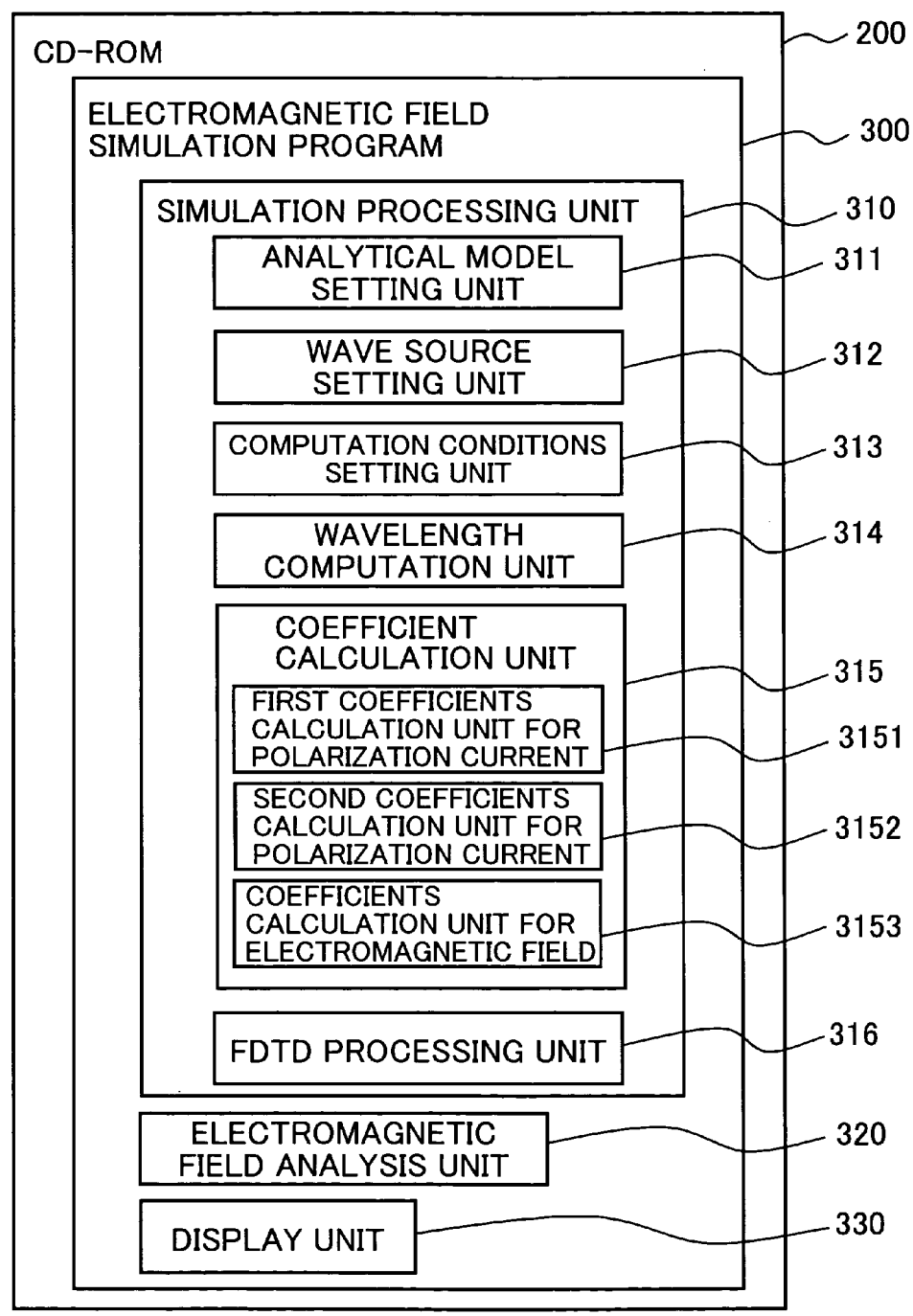
FIG. 3 shows an embodiment of the electromagnetic field simulation program in accordance with the present invention.

FIG. 3 illustrates an embodiment of the electromagnetic field simulation program of the present embodiment.

An electromagnetic field simulation program 300 operates the computer 100 as the electromagnetic field simulator. As shown in FIG. 3, the program 300 has a simulation processing unit 310, an electromagnetic field analysis unit 320, and a display unit 330. Each element of the electromagnetic field simulation program 300 will be described hereinbelow in detail.

Figure 4:
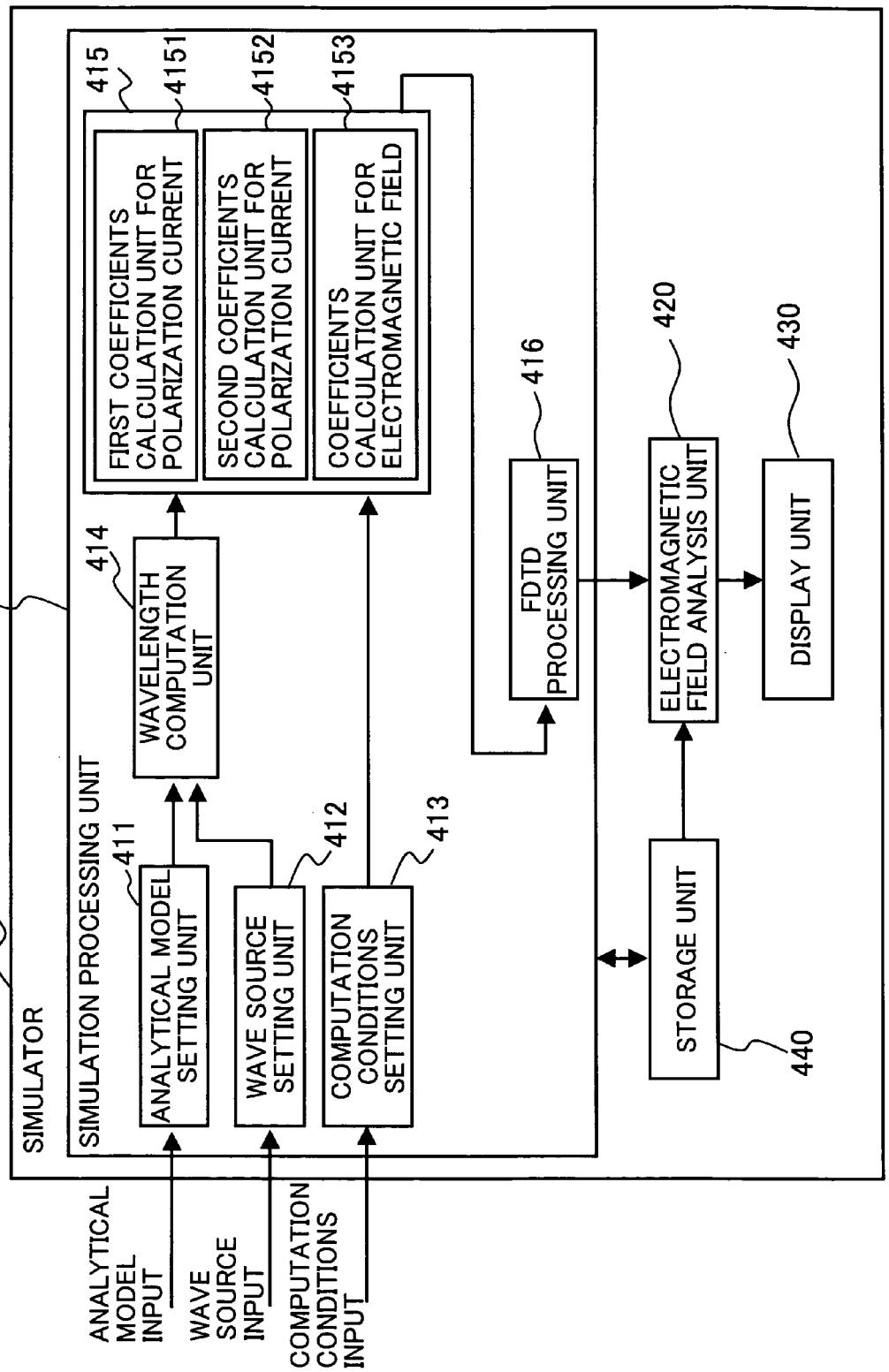
FIG. 4 is a functional block diagram illustrating an embodiment of the electromagnetic field simulator in accordance with the present invention.

FIG. 4 shows an example of a functional block-diagram of the electromagnetic field simulator. An electromagnetic field simulator 400 is constituted by installing the electromagnetic field simulation program 300 shown in FIG. 3 in the computer 100 and executing the program.

Each block unit of the electromagnetic field simulator 400 corresponds to respective elements of the electromagnetic field simulation program 300 shown in FIG. 3, but is constituted by a combination of hardware such as CPU 111 and so on, and an OS or application program executed by the computer 100. Of those components, each element of the electromagnetic field simulation program 300 in FIG. 3 is constituted by only the application program.

As shown in FIG. 4, the electromagnetic field simulator 400 has a simulation processing unit 410, an electromagnetic field analysis unit 420, a display unit 430, and a storage unit 440.

The simulation processing unit 410 further has an analytical model setting unit 411, a wave source setting unit 412, a computation conditions setting unit 413, a wavelength computation unit 414, a coefficients calculation unit 415, and a FDTD computation unit 416.

The analytical model setting unit 411, wave source setting unit 412, and computation conditions setting unit 413 set a analytical model, wave source, computation conditions from various data relating to the analytical model, wave source, and computation conditions, respectively, that were inputted by the user. For example, those data are set by storing in the storage unit 440.

The wavelength computation unit 414 computes the wavelength inside the substance (for example, a metallic substance) from the analytical model that is set by the analytical model setting unit 411 and the wave source that is set by the wave source setting unit 412.

The coefficients calculation unit 415 calculates various coefficients from the wavelength inside the substance computed by the wavelength computation unit 414 and the computation conditions set by the computation conditions setting unit 413.

The coefficients calculation unit 415 has a first coefficients calculation unit 4151 for a polarization current that calculates the coefficients in the first computational formula for the polarization current, a second coefficients calculation unit 4152 for the polarization current that calculates the coefficients in the second computational formula for the polarization current, and an electromagnetic field coefficients calculation unit 4153 for calculating the coefficients in the computational formulas for the electric field and magnetic field.

Each coefficient for the polarization current is computed in either the first coefficients calculation unit 4151 or the second coefficients calculation unit 4152 based on the wavelength computed with the wavelength computation unit 414. Further, the coefficients in the computational formula for electromagnetic field based on the FDTD method are calculated in the electromagnetic field coefficients calculation unit 4153 based on these coefficients.

The FDTD computation unit 416 actually computes various computational formulas in the FDTD method form the coefficients calculated by the coefficients calculation unit 415.

The electromagnetic field analysis unit 420 stores the values computed by the FDTD computation unit 416 in the storage unit 440. For example, an average intensity of the electric field can be obtained from the integrated value of the second power of the electric field for each time step in the FDTD computation unit 416, and storing the value in each storage unit 440.

The display unit 430 (corresponds to the display unit 102 in FIG. 1) displays the analysis results from the electromagnetic field analysis unit 420. For example, the display unit 430 displays so as to visualize the intensity distribution of light.

The FDTD method will be described below. The Maxwell's equation for an electromagnetic field is represented by the following two formulas.

$$\nabla \times H - \varepsilon \frac{\partial E}{\partial t} = \sigma E \qquad \text{[Formula 2]}$$

$$\nabla \times E + \mu \frac{\partial H}{\partial t} = 0 \qquad \text{[Formula 3]}$$

Here, E is an electric field vector, H is a magnetic field vector, $\varepsilon$ is a permittivity, $\sigma$ is an electric conductivity, and $\mu$ is a magnetic permeability. Formulas for calculating a time change of electromagnetic field components obtained with Formula (2) and Formula (3) by employing the FDTD method are shown below. (From Allen Taflove, Susan C. Hagness: "Computational Electrodynamics" (ARTECH HOUSE, INC.))

$$E_x \Big|_{i+1/2,j,k}^n = \left(\frac{1 - \frac{\sigma_{i+1/2,j,k}\Delta t}{2\varepsilon_{i+1/2,j,k}}}{1 + \frac{\sigma_{i+1/2,j,k}\Delta t}{2\varepsilon_{i+1/2,j,k}}}\right) E_x \Big|_{i+1/2,j,k}^{n-1} + $$

[Formula 4]

$$\left(\frac{\frac{\Delta t}{\varepsilon_{i+1/2,j,k}}}{1 + \frac{\sigma_{i+1/2,j,k}\Delta t}{2\varepsilon_{i+1/2,j,k}}}\right) \cdot \left(\frac{H_z\Big|_{i+1/2,j+1/2,k}^{n-1/2} - H_z\Big|_{i+1/2,j-1/2,k}^{n-1/2}}{\Delta y} - \frac{H_y\Big|_{i+1/2,j+1/2,k}^{n-1/2} - H_y\Big|_{i+1/2,j,k-1/2}^{n-1/2}}{\Delta z}\right)$$

$$H_x \Big|_{i,j+1/2,k+1/2}^{n+1/2} = \left(\frac{1 - \frac{\sigma^*_{i,j+1/2,k+1/2}\Delta t}{2\mu_{i,j+1/2,k+1/2}}}{1 + \frac{\sigma^*_{i,j+1/2,k+1/2}\Delta t}{2\mu_{i,j+1/2,k+1/2}}}\right) H_x \Big|_{i,j+1/2,k+1/2}^{n-1/2} + $$

[Formula 5]

$$\left(\frac{\frac{\Delta t}{\mu_{i,j+1/2,k+1/2}}}{1 + \frac{\sigma^*_{i,j+1/2,k+1/2}\Delta t}{2\mu_{i,j+1/2,k+1/2}}}\right) \cdot \left(\frac{E_y\Big|_{i,j+1/2,k+1}^{n} - E_y\Big|_{i,j+1/2,k}^{n}}{\Delta z} - \frac{E_z\Big|_{i,j+1,k+1/2}^{n} - E_z\Big|_{i,j,k+1/2}^{n}}{\Delta y}\right)$$

Here, Ex, Ey, Ez are components of the electric field, Hx, Hy, Hz are components of the magnetic field, σ* is a magnetic conductivity, Δx, Δy, Δz are space grid widths, Δt is a time division width. Subscripts i, j, k of electromagnetic field components are numbers of space grids and indicate the coordinates in a simulation space. Furthermore, superscripts n, n+1 of the electromagnetic field components are numbers indicating the time step. If the time step advances by one, the time advances by Δt.

Figure 5:
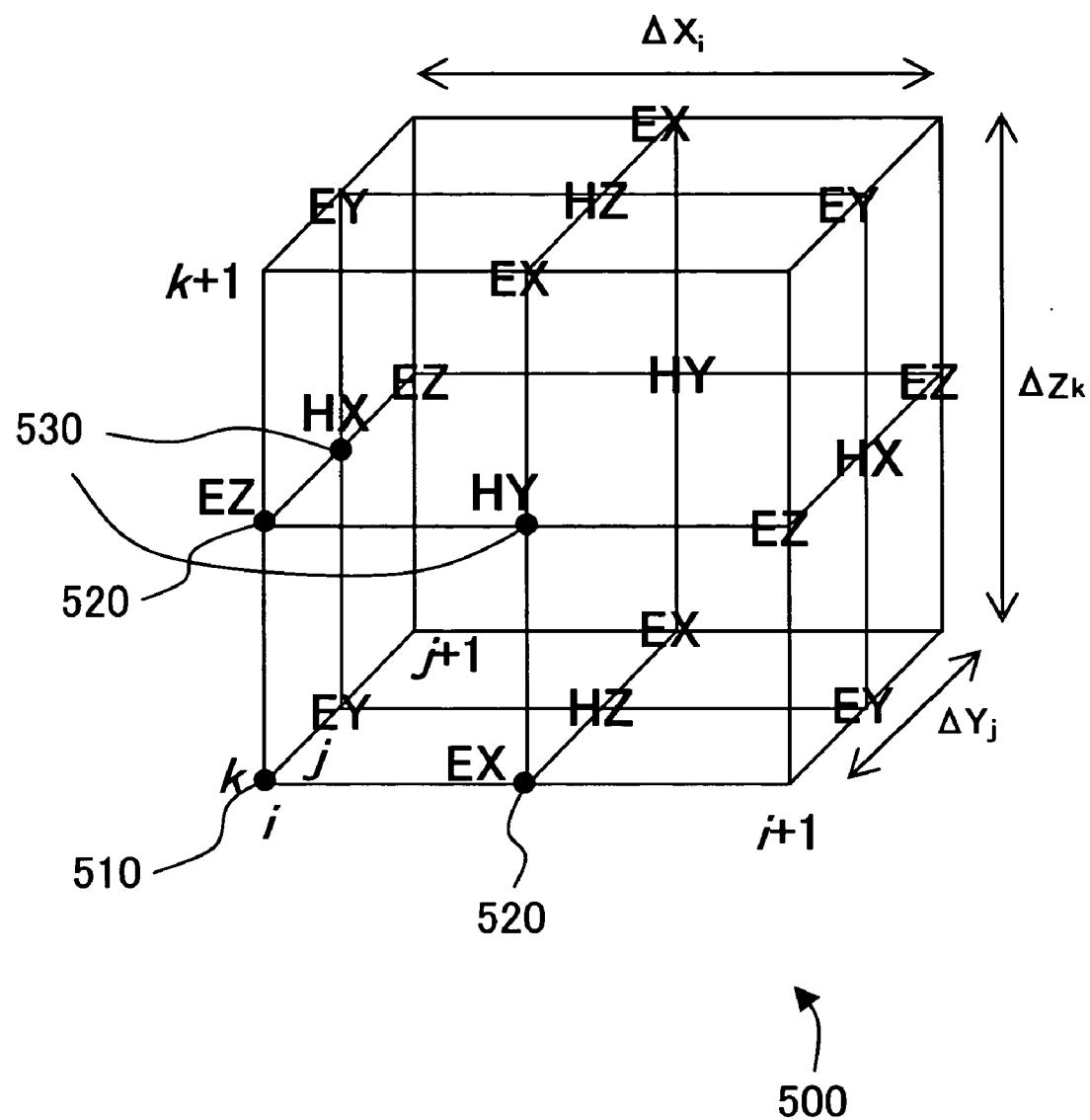
FIG. 5 shows components of electromagnetic wave arranged as a cell.

FIG. 5 shows one cell 500 obtained by dividing the analytical model employing the FDTD method. Spatial arrangement of each of components of the electric field and magnetic field in the cell 500 is also shown. A plurality of such cells 500 is present in the simulation space.

In the FDTD method, the electric field component that is parallel to an edge of the cell is positioned in a central point 520 of the edge of the cell 500, and the magnetic component that is perpendicular to a plane of the cell is arranged in a central point 530 of each plane of cell 500.

In the example shown in FIG. 5, if the position coordinates of an vertex point 510 are denoted by (i, j, k), then the components Ex, Ey, Ez of the electric field will be positioned in (i+½, j, k), (i, j+½, k), (i, j, k+½) respectively, which are the central points 520 of each edge.

Furthermore, the components Hx, Hy, Hz of the magnetic field will be positioned in (i, j+½, k+½), (i+½, j, k+½), (i+½, j+½, k), which are the central points 530 of each plane. The position of each component of the electric field and magnetic field on the "½" grid is also a specific feature of the FDTD method.

The present electromagnetic field simulator 400 uses a spatial distribution of the electromagnetic field at a certain time (n−1) and repeatedly calculates the spatial distribution of the electromagnetic field at a next time (n), thereby conducting analysis of object model.

The above-described formula (4) and formula (5) represent computational formulas for only the X components of the electric field and magnetic field, but the computational formulas for Y component and Z component of the electric field and magnetic field can be also represented in a form corresponding to those formulas.

Though the FDTD method is generally used for radio wave analysis, as described above, it can also be employed for optical analysis including metals. However, the problem arising in this case due to a material constant of metallic substances is that each of component values of electric field and magnetic field calculated with formula (4) and formula (5) diverges.

The material constant such as permittivity and electric conductivity vary depending on the frequency of electromagnetic wave, but the permittivity of metal in most cases have negative values at a light frequency. If the permittivity constant of vacuum is denoted by $\epsilon_0$, then permittivities of gold, silver, and aluminum with respect to light having a wavelength of 400 nm is "−1.08 $\epsilon_0$", "−3.77 $\epsilon_0$", and "−23.4 $\epsilon_0$" respectively.

More specifically, when the permittivity $\epsilon$ is negative, the numerator of the coefficient (in the parentheses) of the first term in the right side of formula (4) will be positive. The first term in the right side is a term ($Ex|^{n-1}$) referring to a time step (n−1) preceding the electric field component Ex in the same position coordinate, and if the coefficient assumes a large positive value, then the value thereof will exponentially increase as the computation steps advance. Therefore, component values of the electric field and magnetic field diverge if the computation is repeated.

A computational formula based on the FDTD method using the polarization current is used to resolve the divergence problems, as described in Justin B. Judkins and Richard W. Ziolkowski, "Finite-difference time-domain modeling of nonperfectly conducting metallic thin-film gratings", J. Opt. Soc. Am. A Vol. 12, No. 9, p. 1974-1983, 1995. This will be explained in detail below.

A complex permittivity $\epsilon^*$ is generally a material constant including both the permittivity $\epsilon_r$ of the substance and electric conductivity σ, and can be represented by the following formula.

$$\varepsilon^* = \varepsilon_r - j\frac{\sigma}{\omega}$$

[Formula 6]

Here, ω is an angular frequency of light.

An electric flux density D is product of an electric field E and the complex permittivity $\epsilon^*$. Using the electric flux density D in the above-described formula (2) lead to $$\nabla \times H - \frac{\partial D}{\partial t} = 0.$$

[Formula 7]

If the substance has the negative permittivity, it means that $\epsilon_r$ in formula (6) is negative. When a polarization is introduced, the electric flux density D and polarization have the following relationship with each other.

$$D = \epsilon_\infty E + P$$

[Formula 8]

$\epsilon_\infty$ is a permittivity of a substance in an electromagnetic wave with a high frequency where no polarization occurs and is called an instantaneous permittivity. P is the polarization. The polarization P changes with time together with the electric field E, and this change is determined by a polarization characteristic of the substance. For example, if a dispersion characteristic of a Drude type is assumed, the polarization P will be described by the following differential equation.

$$\frac{\partial^2 P}{\partial t^2} + \Gamma \frac{\partial P}{\partial t} = \varepsilon_0 \omega_p^2 E \qquad \text{[Formula 9]}$$

Here, $\Gamma$ and $\omega_p$ are constants deciding the dispersion characteristic.

Alternatively, Using a polarization current defined by $$J_p \partial = P/\partial t \qquad \text{[Formula 10]}$$

in formula (9) lead to.

$$\frac{\partial J_P}{\partial t} + \Gamma J_P = \varepsilon_0 \omega_p^2 E \qquad \text{[Formula 11]}$$

The following relationship exists between permittivity $\varepsilon_r$ of the substance, electric conductivity $\sigma$, and constants $\Gamma$ and $\omega_p$ by formula (9) and formula (11).

$$\varepsilon_r = \varepsilon_\infty - \frac{\varepsilon_0 \omega_p^2}{\omega^2 + \Gamma^2} \qquad \text{[Formula 12]}$$

$$\sigma = \frac{\varepsilon_0 \omega_p^2 \Gamma}{\omega^2 + \Gamma^2} \qquad \text{[Formula 13]}$$

Because there are three variables: $\Gamma$, $\omega_p$, and $\varepsilon_\infty$ for two material constants: $\varepsilon_r$ (permittivity) and $\sigma$ (electric conductivity), there is a certain degree of freedom in setting the variables. Here, the substance having the negative permittivity $\varepsilon$ with the FDTD method can be computed by setting the instantaneous permittivity $\varepsilon_\infty$ to a positive value and setting the constants $\Gamma$ and $\omega_p$ so that the permittivity $\varepsilon_r$ of the substance in formula (12) assumes a negative value.

Using formula (8) in formula (7), the following formula is obtained.

$$\nabla \times H - \varepsilon_\infty \frac{\partial E}{\partial t} = \frac{\partial P}{\partial t} = J_P \qquad \text{[Formula 14]}$$

A following formula can be obtained by finding the formula corresponding to formula (4) from this formula (14).

$$E_x \big|_{i+1/2,j,k}^n = E_x \big|_{i+1/2,j,k}^{n-1} + \left( \frac{\Delta t}{\varepsilon_{\infty i+1/2,j,k}} \right) \cdot \qquad \text{[Formula 15]}$$
$$\left( \frac{H_z \big|_{i+1/2,j+1/2,k}^{n-1/2} - H_z \big|_{i+1/2,j-1/2,k}^{n-1/2}}{\Delta y} - \right.$$
$$\left. \frac{H_y \big|_{i+1/2,j,k+1/2}^{n-1/2} - H_y \big|_{i+1/2,j,k-1/2}^{n-1/2}}{\Delta z} \right) -$$
$$\left( \frac{\Delta t}{\varepsilon_{\infty i+1/2,j,k}} \right) \cdot J_P \big|_{i+1/2,j,k}^{n-1/2}$$

In formula (15), because the coefficient of the first term $(Ex|^{n-1})$ in the right side referring to be previous time step (n−1) is "1", the aforementioned divergence problem can be avoided.

For the polarization current J, a following formula can be obtained from formula (11).

$$J_{Px}\big|_{i+1/2,j,k}^{n-1/2} = \frac{2 - \Gamma \Delta t}{2 + \Gamma \Delta t} J_{Px}\big|_{i+1/2,j,k}^{n-1/2} + \frac{2\Delta t}{2 + \Gamma \Delta t} \varepsilon_0 \omega_p^2 Ex \big|_{i+1/2,j,k}^n \qquad \text{[Formula 16]}$$

In formula (16), the time step of the polarization current $J_p$ assume semi-integral values such as "n+½", "n−½". Furthermore, the computation of magnetic field H uses formula (5) similarly to the usual FDTD method.

In a general approach of optical analysis of a model including a metal by using the FDTD method, the computation of magnetic field H, electric field E, and polarization current J uses formula (5), formula (15), and formula (16), respectively.

Problems arising when the analysis is conducted by using those formulas will be described below.

Figure 6:
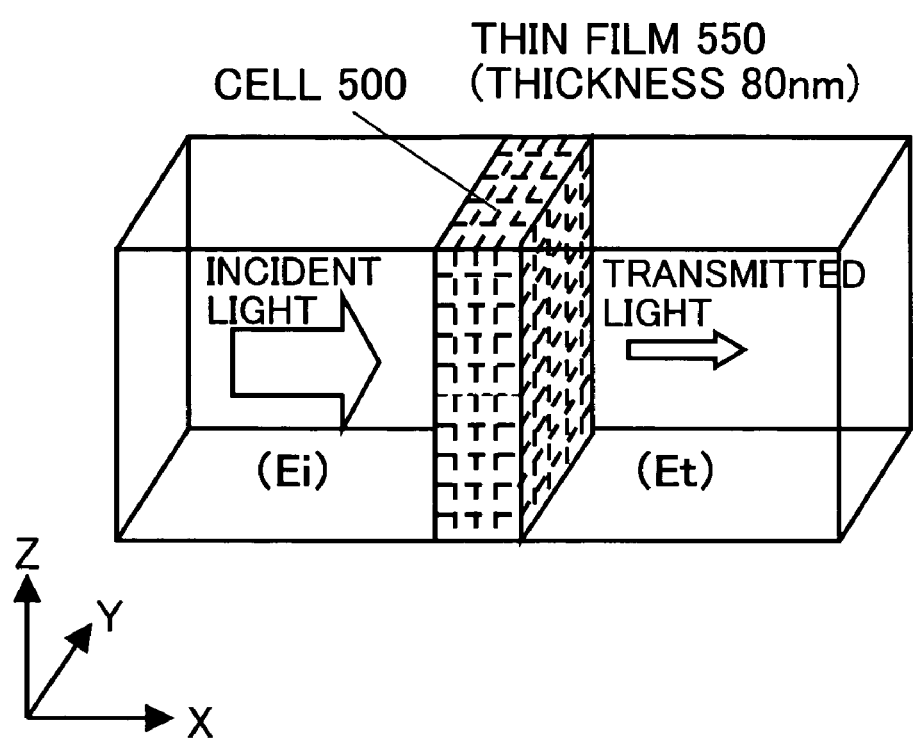
FIG. 6 shows an example of analytical model.

FIG. 6 shows an example of the analytical mode. A transmittance of a thin film 550 was computed by the FDTD method using the above-described polarization current $J_p$ as an example of optical analysis using the FDTD method.

A thickness of the thin film 550 was "80 nm", a refractive index was "1", the wavelength of light is "780 nm", the light was caused to fall perpendicularly to the thin film 550, and the transmittance ($|Et|^2/|Ei|^2$) of the thin film 550 was computed by finding a ratio of intensities of a incidence light and transmitted light. A extinction coefficient (degree to which the light is absorbed when passing through the substance) was changed from "1.5" to "5" to change the transmittance. The calculation was conducted under two conditions, "20 nm" and "5 nm", relating to the grid spacing which divides the analytical space.

The refractive index n, and extinction coefficient κ, are not shown in the above-described formula (15) and formula (16). The refractive index n, and extinction coefficient κ, generally satisfies the following relationships:

$$\varepsilon_r = \varepsilon_0(n^2 - \kappa^2) \qquad \text{[Formula 17]}$$

$$\sigma = 2\varepsilon_0 n \kappa \omega \qquad \text{[Formula 18]}$$

Accordingly, the computation of formula (15) and formula (16) is calculated by using those relationships.

Figure 7A:
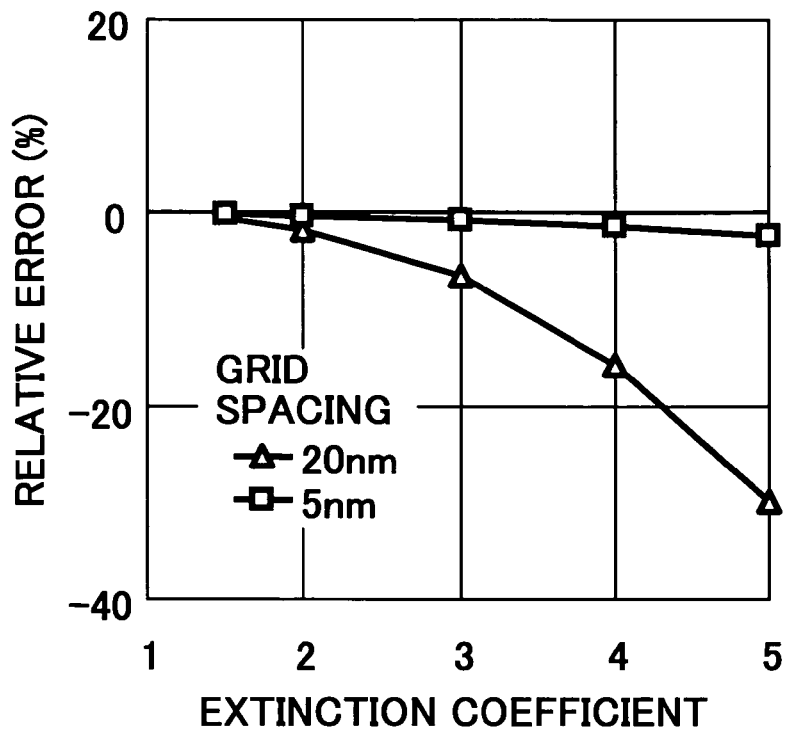
FIG. 7A shows an example of analysis results.

FIG. 7A is a graph showing the analysis results. Here, a horizontal axis of the graph indicates the extinction coefficient κ, and a vertical axis indicates a relative error (computation error of the FDTD method) between the transmittance obtained by the FDTD method and the transmittance obtained by a rigorous calculation. Because the transmittance of the thin film 550 can be accurately computed from the refractive index n, extinction coefficient κ, and thickness, the value obtained by such computations is the transmittance obtained by the rigorous calculation.

Though the relative error generally increases because the light intensity decreases with the increase in the extinction coefficient, the relative error could be small (the relative error was about "2%" at the extinction coefficient "5"), despite the large extinction coefficient, when the grid spacing is "5 nm", as shown in FIG. 7A.

However, when the grid spacing is "20 nm", the error is large significantly with the increase in the extinction coefficient. In the example shown in FIG. 7A, the error was about "30%" at the extinction coefficient "5".

It is clear that the grid spacing may be decreased in order to inhibit the error such as shown in FIG. 7A. However, for example, if the grid spacing is made "½", the grid number becomes "8"-fold in the three-dimensional analysis.

On the other hand, the following conditions generally have to be satisfied with respect to the time step Δt in order to conduct computations with good stability, without the divergence of computations with the FDTD method.

$$\Delta t \leq \frac{1}{v\sqrt{\left(\frac{1}{\Delta x}\right)^2 + \left(\frac{1}{\Delta y}\right)^2 + \left(\frac{1}{\Delta z}\right)^2}} \quad \text{[Formula 19]}$$

Here, v is a velocity of electromagnetic wave.

Thus, formula (19) demonstrates that if the grid spacing is made "½", the time step Δt also has to be reduced by "½". As a result, the computation time increases, and the number of values used also rises, thereby making it necessary to increase the memory capacity. The computation cost is therefore raised.

A computation method making it possible to reduce the computation error and also to decrease the computation cost even in the case of coarse grid spacing will be described below.

If the time derivative is replaced with the difference in formula (11) describing the polarization current P inside the substance, the following formula is obtained.

$$\frac{J|_{i+1/2,j,k}^{n+1/2} - J|_{i+1/2,j,k}^{n-1/2}}{\Delta t} + \Gamma J|_{i+1/2,j,k}^{n} = \varepsilon_0 \omega_p^2 E|_{i+1/2,j,k}^{n} \quad \text{[Formula 20]}$$

Focusing attention on formula (20), the time step of the polarization current $J_p$ of the first term in the left side is semi-integral values as "n+½", "n−½". On the other hand, the time step of the polarization current $J_p$ of the second term in the left side is an integral value as "n". Furthermore, the time step of the electric field E assumes an integral value.

Here, the value "n" of the integral step will be found by following formula from the two semi-integral step values "n+½", "n−½" of the polarization current $J_p$ that were the preceding and following values in time.

$$J|_{i+1/2,j,k}^{n} = f J|_{i+1/2,j,k}^{n+1/2} + (1-f) J|_{i+1/2,j,k}^{n-1/2} \quad \text{[Formula 21]}$$

The parameter f satisfies a condition $0 \leq f \leq 1$.

Figure 7B:
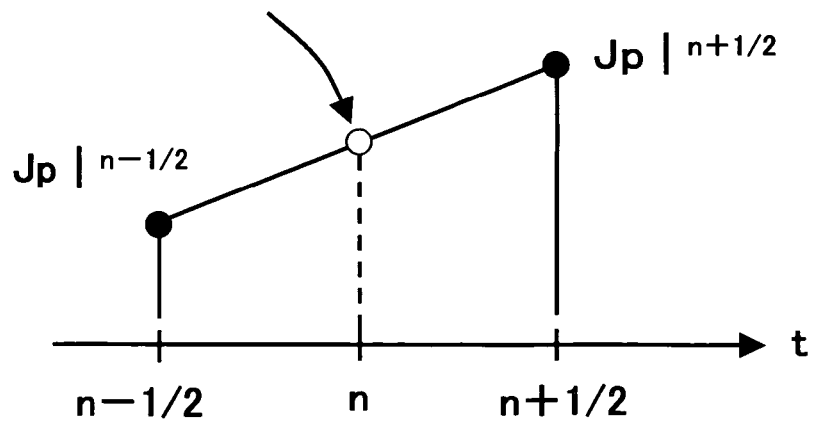
FIG. 7B is a schematic drawing illustrating the calculation method for finding the intermediate value between preceding and subsequent time steps.

As shown in formula (21), there is a certain arbitrarity in the value ($J|^n$) of the polarization current of the integral step within the range of parameter f. In the usual computation, formula (21) is computed at f=½, which is the average value. FIG. 7B is schematic drawing of such computation. The recurrence formula at this case is the aforementioned formula (16).

On the other hand, the case of f=1, rather than f=½, is considered as a replacement for the polarization current ($J|^n$). Thus, the computation is conducted by using a value obtained by the semi-integral step advance as the integral step value. In this case, a formula corresponding to formula (16) for the polarization current $J_p$ can be presented as follows.

$$J|_{i+1/2,j,k}^{n+1/2} = \frac{1}{1+\Gamma\Delta t} J|_{i+1/2,j,k}^{n-1/2} + \frac{\Delta t}{1+\Gamma\Delta t} \varepsilon_0 \omega_p^2 E|_{i+1/2,j,k}^{n} \quad \text{[Formula 22]}$$

By changing the formula for the polarization current $J_p$ from formula (16) to formula (22), the trend of error occurrence is changed and the occurrence of errors can be reduced even under conditions with large grid spacing. This issue will be considered below.

FIG. 8 shows comparison results between the computation by formula (16) (the usual computational formula) and by formula (22) (computational formula in accordance with the present invention), with the grid spacing of "20 nm" in the above-described model shown in FIG. 6.

As shown in FIG. 8, when the extinction coefficient is small, the error is smaller if formula (16), which is the usual computational formula, is used. If the extinction coefficient becomes about "3.4", the error is minimal when formula (22) is used. And if the extinction coefficient further increases, the error obtained when formula (22) is used is less than that obtained with formula (16), which is the usual computational formula.

In other words, if formula (22) is used, the error can be reduced even if the grid spacing is as large "20 nm". However, when the grid spacing is sufficiently small, the error can be sufficiently reduced even by using formula (16) (see FIG. 7A).

Therefore, the problem of computation cost increase and so on can be avoided by evaluating the grid spacing by any method, judging which of the case using formula (16) or formula (22) is more adequate, and employing the case producing the smaller error.

In the present embodiment, the evaluation of the grid spacing and the judgment as to whether formula (16) or formula (22) may be used are performed based on a wavelength λ' of light falling on the metallic substance.

The wavelength λ' of light inside the substance can be obtained by the following formula:

$$\lambda' = \frac{\lambda}{\sqrt{|\varepsilon^*|/\varepsilon_0}} \quad \text{[Formula 23]}$$

In formula (23), the complex permittivity $\epsilon^*$ can be calculated by a following formula from the refractive index n, and extinction coefficient κ.

$$\epsilon^* = \varepsilon_0(n-j\kappa)^2 = (n^2-\kappa^2) - 2j\epsilon_0 n\kappa \quad \text{[Formula 24]}$$

Figure 9:
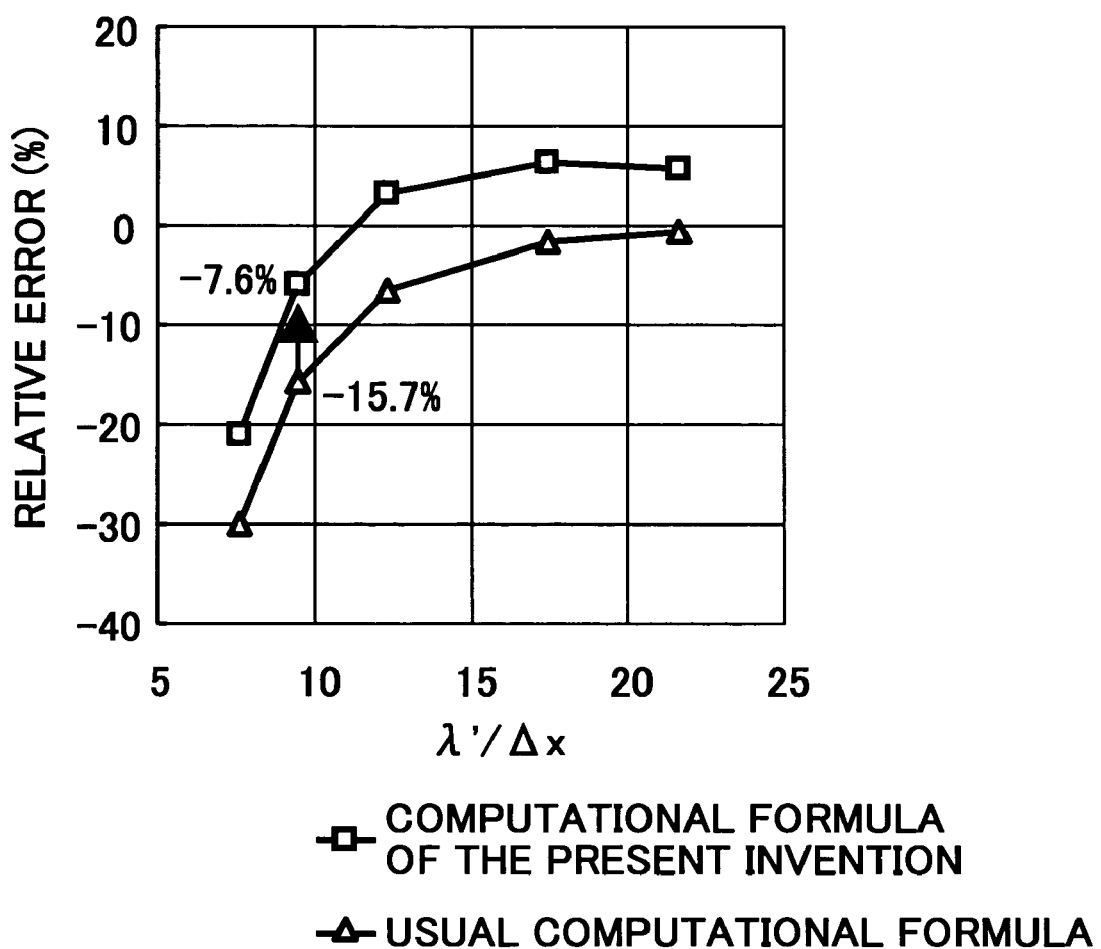
FIG. 9 shows an example of analysis results.

FIG. 9 is a graph in which a horizontal axis of the graph indicates value obtained by dividing the wavelength λ' inside the substance by the grid spacing Δx with respect to the data shown in FIG. 8, and a vertical axis indicates the relative error. The grid spacing with respect to the wavelength inside the substance is larger on the left side of the graph.

Focusing attention on "10" on the horizontal axis λ'/Δx, one can see that the error was about "−15.7%" in the case of using computational formula (16) (usual computational formula) indicating polarization computations. On the other hand, the error was "−7.5%" in the case of using computational formula (22) (computational formula in accordance with the present invention) indicating the polarization computation alike. In other words, at a value of "10" on the horizontal axis, the error can be reduced by using formula (22).

Furthermore, even in the region of values less than "10" on the horizontal axis the error can be reduced by using formula (22) with respect to that obtained by using formula (16).

Thus, FIG. 9 demonstrates that when the grid spacing Δx is equal to or more than "1/10" of the wavelength λ' inside the substance (the region below "λ'/Δx=10"), using formula (22) can reduce the error with respect to the case where formula (16) is used.

On the other hand, when the grid spacing $\Delta x$ is less than "$1/10$" of the wavelength $\lambda'$ inside the substance (the region above "$\lambda'/\Delta x=10$"), using formula (16), which is the usual computational formula, can reduce the error.

Setting the grid spacing of "$1/10$" of the wavelength as a criterion for switching between the formulas (formula (16) and formula (22)) for computing the polarization current $J_p$ makes it possible to reduce the error in computation results even when the grid spacing is large.

If the grid spacing is the same, as shown in FIG. 7A, the error increases with the increase in extinction coefficient. A metal that have a negative dielectric constant have large extinction coefficient. When computations are conducted by the FDTD method to conduct optical analysis of the model including the metal, even the metal constitutes only part of the material, the polarization of the substance with high extinction coefficient, such as the metal, has to be computed. Therefore, the above-described switching between computational formulas is especially useful in optical analysis.

Figure 10:
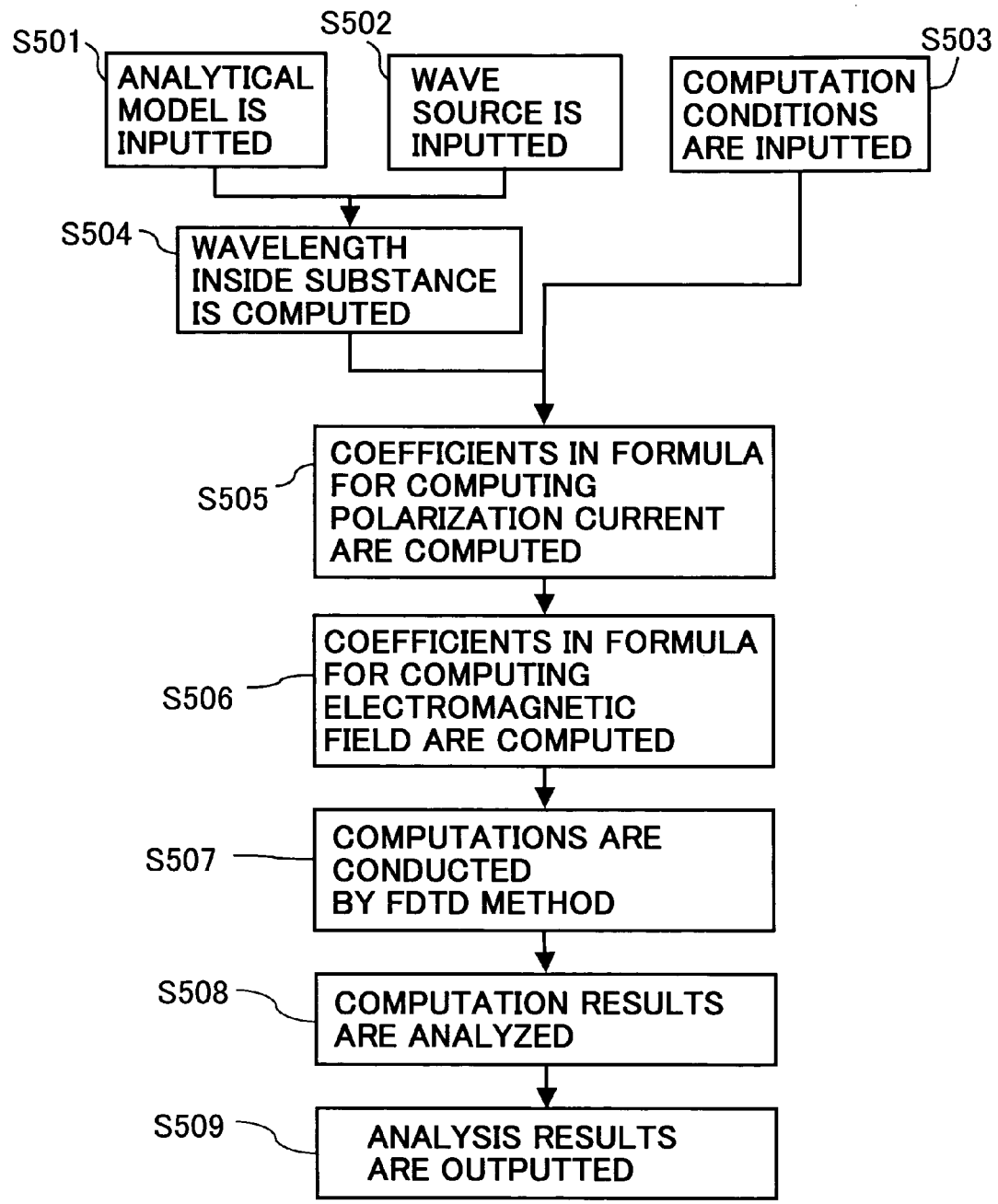
FIG. 10 shows an example of a flowchart illustrating the processing operation.

FIG. 10 shows a flowchart illustrating the operation of processing in the case where the computation is performed with the above-described FDTD method. This is the processing executed in the electromagnetic field simulator 400 shown in FIG. 4.

First, each value of the analytical model is inputted into the analytical model setting unit 411 (S501). More specifically, values relating to the shape of the objects, transmittance $\epsilon$, magnetic permeability $\mu$, electric conductivity $\sigma$, and so on are inputted. The analytical model of the analysis object is thereby set.

Furthermore, each value defining the wave source is inputted into the wave source setting unit 412 (S502). More specifically, values relating to a shape and position of the wave source, electric field amplitude Eo, angular velocity $\omega$ of light, initial phase $\phi$ of light, and so on are inputted. The wave source is thereby set in the analytical model. Furthermore, the wave source setting unit 412 sets a position and intensity of the wave source for generating the electromagnetic wave for computing the spatial distribution (formula (4) or formula (5), and formula (16) or formula (22)) of the electromagnetic field. Each value indicating them is inputted.

Furthermore, each value of computation conditions is inputted into the computation conditions setting unit 413 (S503). More specifically, each value of spatial grid widths $\Delta x$, $\Delta y$, $\Delta z$ and time division width $\Delta t$ are inputted. Spatial notch quantity (coarseness) and time notch quantity (coarseness) in the model are inputted. Because the sampling resolutions of time and space in electromagnetic field simulation are set by $\Delta x$, etc., the computation conditions setting unit 413 includes a function of the grid setting unit.

Then, the wavelength $\lambda'$ inside the objects is computed in the wavelength computation unit 414 from the inputted analytical model and wave source (S504). More specifically, the computation of formula (23) is performed.

Then, the coefficients of the formula for computing the polarization current are calculated in the coefficients calculation unit 415 from the wavelength $\lambda'$ inside the objects and computation conditions that are set (S505).

Figure 11:
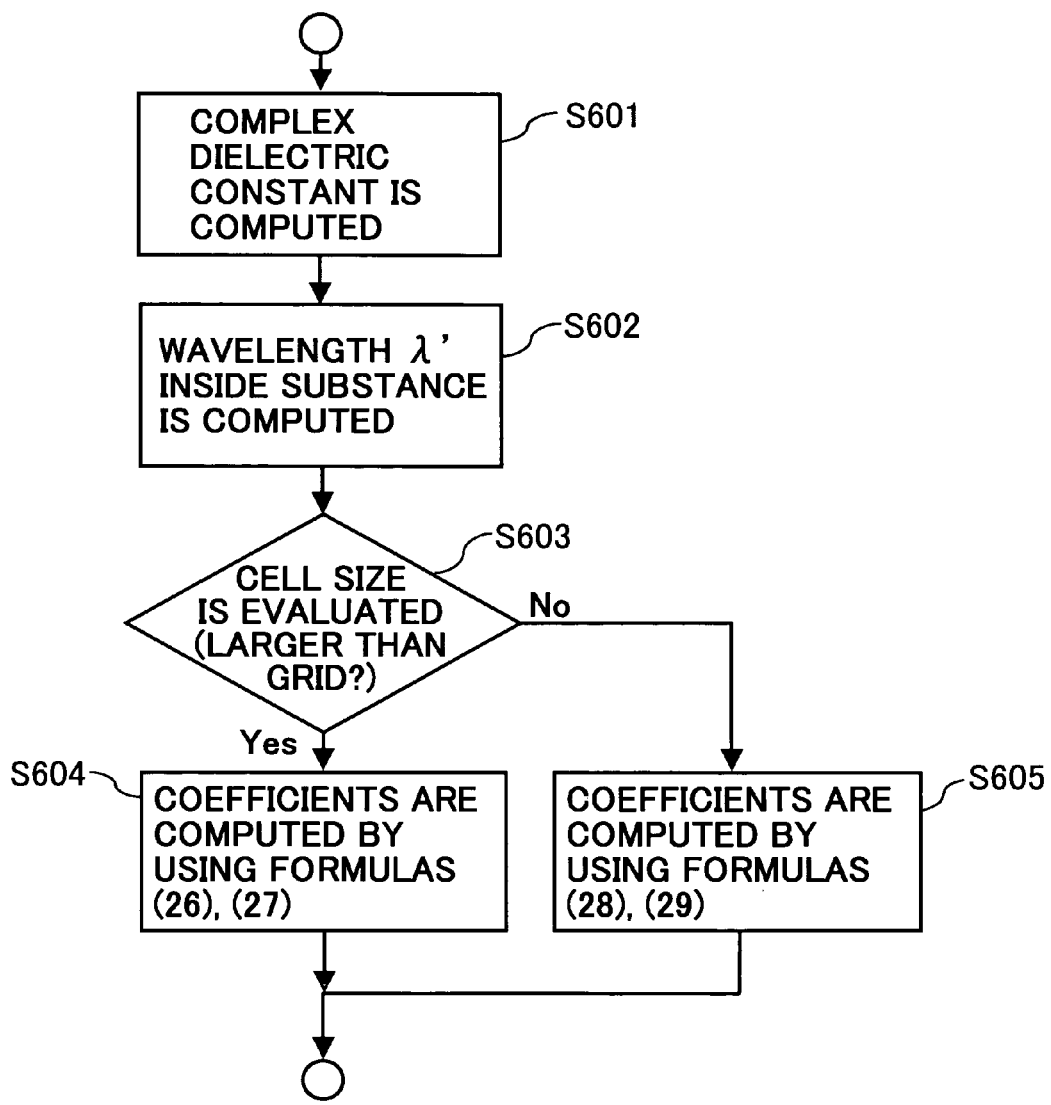
FIG. 11 shows an example of a flowchart illustrating the processing operation.

The processing of those steps S504 and S505 is shown in detail in FIG. 11. The step S504 corresponds to the steps S601 and S602 in FIG. 11, and the step S505 corresponds to steps S603 to S605.

First, the complex permittivity $\epsilon^*$ is computed in the wavelength computation unit 414 (S601). The computation is carried out with formula (24). Then, the wavelength $\lambda'$ is computed from the complex permittivity $\epsilon^*$ by using formula (23) (S602).

Cell size evaluation is then performed in the coefficients calculation unit 415 (S603). Thus, a decision is made, as described above, as to whether or not the grid spacing is equal to or more than "$1/10$" of the wavelength $\lambda'$. Because the grid spacing is inputted into the computation conditions setting unit 413 and the wavelength $\lambda'$ is computed in step S602 (S504), the judgment can be made by the comparison thereof.

When the grid spacing is equal to or more than "$1/10$" of the wavelength $\lambda'$ (YES in S603), the coefficients value in formula (22) for polarization computations is calculated (S604) in the first coefficients calculation unit 4151 for polarization current. On the other hand, when the grid spacing is less than "$1/10$" of the wavelength $\lambda'$ (NO in S603), the coefficients value in formula (16) for polarization computations is calculated in the second coefficients calculation unit 4152 for polarization current.

Generalizing formula (16) and formula (22) for polarization current, we obtain:

$$J|_{i+1/2,j,k}^{n+1/2} = A_{i+1/2,j,k} \cdot J|_{i+1/2,j,k}^{n-1/2} + B_{i+1/2,j,k} \cdot E|_{i+1/2,j,k}^{n} \quad \text{[Formula 25]}$$

The difference between formula (16) and formula (22) is only in the coefficients. First, coefficients are calculated following the conditions of S603, and then formula (16) or formula (22) of the FDTD method of the next stage is computed.

From formula (25) and formula (22), the coefficients become as follows:

$$A_{i+1/2,j,k} = \frac{1}{1+\Gamma\Delta t} \quad \text{[Formula 26]}$$

$$B_{i+1/2,j,k} = \frac{\Delta t}{1+\Gamma\Delta t} \varepsilon_0 \omega_p^2 \quad \text{[Formula 27]}$$

Thus, when the grid spacing is equal to or more than "$1/10$" of the wavelength $\lambda'$ (YES in S603), the grid spacing is considered to be large, and the coefficients are calculated by using formula (26) and formula (27) (S604).

On the other hand, from formula (25) and formula (16), the coefficients become as follows:

$$A_{i+1/2,j,k} = \frac{2-\Gamma\Delta t}{2+\Gamma\Delta t} \quad \text{[Formula 28]}$$

$$B_{i+1/2,j,k} = \frac{2\Delta t}{2+\Gamma\Delta t} \varepsilon_0 \omega_p^2 \quad \text{[Formula 29]}$$

Thus, when the grid spacing is less than "$1/10$" of the wavelength $\lambda'$ (NO in S603), the grid spacing is considered to be small, and the coefficients are calculated by using formula (28) and formula (29) (S605).

The constants $\Gamma$, $\omega_p$ that determine the dispersion characteristic can be calculated by the following formula from the refractive index n, extinction coefficient $\kappa$, instantaneous permittivity $\epsilon_\infty$, and angular frequency $\omega$ of light.

$$\Gamma = \frac{2\omega n\kappa}{\varepsilon_\infty/\varepsilon_0 - n^2 + \kappa^2} \quad \text{[Formula 30]}$$

$$\omega_p^2 = \frac{\omega^2(\varepsilon_\infty/\varepsilon_0 - n^2 + \kappa^2)^2 - (\sigma/\varepsilon_0)^2}{\varepsilon_\infty/\varepsilon_0 - n^2 + \kappa^2} \quad \text{[Formula 31]}$$

Furthermore, the calculated coefficients A, B are stored in the storage unit 440 with a high access speed (RAM 112 in FIG. 2).

Returning to FIG. 10, if each coefficient is calculated in the coefficients calculation unit 415 (S505, 506), the computation by the FDTD method is then executed in the FDTD computation unit 416 (S507). As described hereinabove, when the grid spacing is large, the polarization computation is conducted by using formula (22). When the grid spacing is small, the polarization computation is conducted by using formula (16).

Next, the computation results are then analyzed in the electromagnetic field analysis unit 420 (S508). More specifically, second powers of each value E, H of each computed electromagnetic field are stored in the storage unit 440 and the integrated values are stored in the storage unit 440.

Next, the analysis results are then outputted from the electromagnetic field analysis unit 420 (S509). For example, the analysis results are outputted to the display unit 430 and displayed therein. Alternatively, the analysis results are stored on the hard disk 220.

Each figure in FIG. 12 represents an example of analysis results displayed on the display unit 430. Those results are obtained by simple computations in a two-dimensional space performed with respect to a model in which a thin film of gold with a thickness of "70.7 nm" is set in a probe with an apex angle of 90°. The light wavelength is taken as "400 nm" and the light propagates from the left to the right in each figure.

Figure 12A:
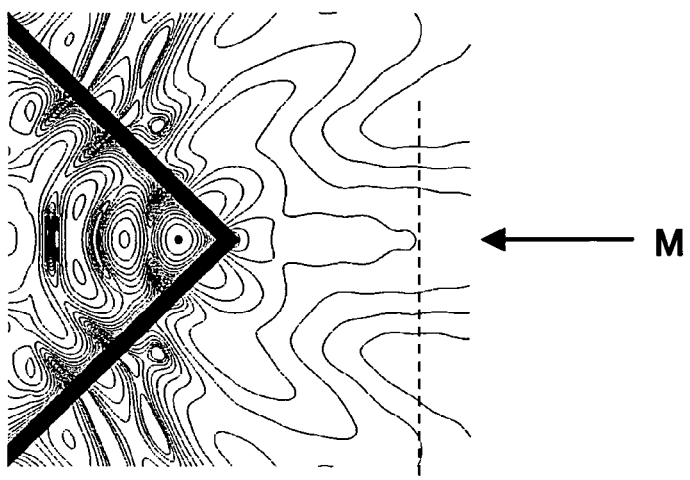
FIGS. 12A to C show examples of analysis results by distributions of light intensity.
Figure 12B:
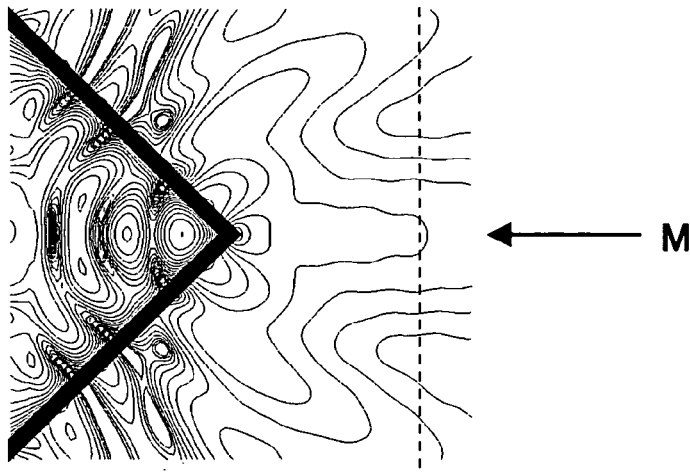
Figure 12C:
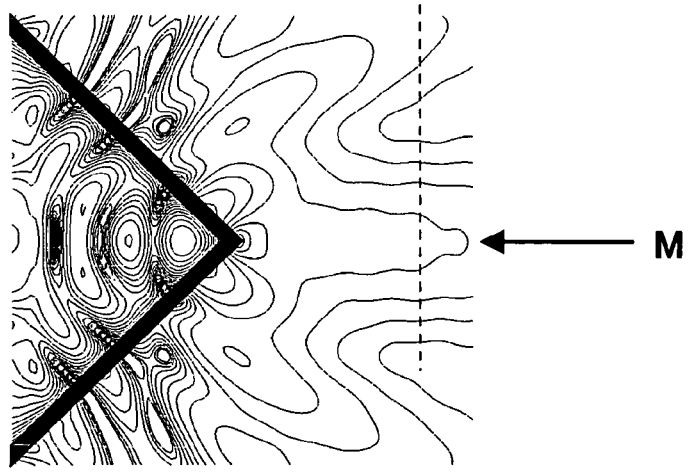

FIG. 12A shows the results obtained by performing the computation with formula (16), which is the usual computational formula, where the grid spacing is taken as "5 nm". FIG. 12B shows the results obtained by performing the computation with formula (22), which is the formula of the present embodiment, where the grid spacing is taken as "20 nm". FIG. 12C also shows the results obtained by performing the computation with formula (16), which is the usual computational formula, where the grid spacing is taken as "20 nm".

In this case, the wavelength $\lambda'$ inside the thin film of gold is "156.0 nm", as follows from formula (23). The grid spacing of "20 nm" is more than "1/10" of the wavelength $\lambda'$, and suitability conditions shown in FIG. 11 are satisfied.

Focusing attention of the region indicated by arrow M, the computation results obtained by using formula (22) (see FIG. 12B) and the computation results obtained by using formula (16) (see FIG. 12C) demonstrate that the results obtained by using formula (22) are closer to the computation results obtained with the small grid spacing (see FIG. 12A).

Thus, when the grid spacing is large, performing the computation with formula (22) reduces the error and makes it possible to obtain a value that can be used as an approximate value.

As described hereinabove, when the spatial grid spacing is large, the computation is conducted with the FDTD method based on polarization by using formula (22), and when the spatial grid spacing is small, the computation is conducted with the FDTD method based on polarization by using formula (16). Therefore, the present electromagnetic field simulator 400 makes it possible to reduce the computation cost and obtain analysis results with a small computational error.

Such analytical model can be advantageously employed in a SNOM (Scanning Near-field Optical Microscope) for measuring the sample surface by irradiating light from a metal thin-film probe. The present electromagnetic field simulator 400 is suitable for analyzing the behavior of light in such SNOM.

In the above-described example, the explanation was conducted with respect to a Drude dispersion model as a dispersion model. However, other dispersion models such as a Lorentz model and so on can be similarly analyzed in the electromagnetic field simulator 400, and the demonstrated operation and effect are identical to that of the above-described example.

In the above-described example, the explanation was conducted with respect to the case where whether or not the grid spacing was equal to or larger than "1/10" of the wavelength $\lambda'$ of the light inside a metal substance was selected as a criterion for judging whether the spatial grid spacing is large or small. It goes without saying that the operations can be conducted in the same manner as in the above-described example, and the same operation and effect are is demonstrated when a value close to "1/10" is used as a criterion.

In the above-described example, the explanation was conducted with respect to the case where the electromagnetic field simulation program of the present embodiment was stored in the CD-ROM 200. It goes without saying that the simulation program may be also recorded on a recording medium other than the CD-ROM 200, e.g., on the flexible disk 210. If the program can be read and executed with the computer 100, the operations can be conducted in the same manner as in the above-described example, and the same operation and effect is demonstrated.

What is claimed is:

1. An electromagnetic field simulator for repeatedly calculating a spatial distribution of an electromagnetic field at a point in time (n) by using a spatial distribution of the electromagnetic field at a previous point in time (n−1), the simulator comprising:

a computer;

a memory operatively connected to the computer;

a computation conditions setting unit to set sampling resolutions of time and space in a simulation of the electromagnetic field;

a coefficients setting unit to set coefficients for the electromagnetic field calculation in each position on a simulation space;

a polarization calculation unit to calculate a spatial distribution of the electromagnetic field and a spatial distribution of a polarization current inside a substance at the point in time (n) by using a spatial distribution of the electromagnetic field and a spatial distribution of the polarization current inside the substance at the previous point in time (n−1) and the coefficients, which are set by the coefficients setting unit; and a display unit to display an analysis result based on the calculated spatial distribution of the electromagnetic field, wherein the coefficients setting unit switches from a first computational formula used to calculate the spatial distribution of the polarization current in the polarization calculation unit to a second computational formula based on the sampling resolution of the space, which is set in the computation conditions setting unit, and the polarization calculation unit calculates the spatial distribution of the polarization current at the point in time (n) by using the second computational formula, and at least one of the computations setting unit, the coefficients setting unit, the polarization calculation unit, and the display unit is implemented by the computer and the memory.

2. The electromagnetic field simulator according to claim 1, further comprising:

a wave source setting unit to set a generation source of an electromagnetic wave to compute the spatial distribution of the electromagnetic field, wherein the polarization calculation unit switches from the first computational formula to the second computational formula based on the coefficients that are set by the coefficients setting unit, and a wavelength of the wave source that is set by the wave source setting unit.

3. The electromagnetic field simulator according to claim 2, wherein the coefficients setting unit switches from the first computational formula to the second computational formula based on a value of a variable a, obtained from:

$$\frac{1}{\Delta x} \frac{\lambda}{\sqrt{|\epsilon^*|/\epsilon_0}} = a \qquad \text{[Formula 1]}$$

where $\epsilon^*$ stands for a complex permittivity derived from the coefficient, which is set by the coefficients setting unit, $\lambda$ stands for the wavelength, which is set by the wave source setting unit, $\Delta x$ stands for the sampling resolution of the space, and $\lambda_0$ stands for a permittivity of vacuum.

4. The electromagnetic field simulator according to claim 3, wherein the second computational formula is obtained by modifying a calculation method for finding an intermediate value between preceding and subsequent time steps.

5. The electromagnetic field simulator according to claim 4, wherein the second computational formula is a computational formula using a value obtained by semi-integral step advancing the intermediate value between preceding and subsequent time steps.

6. The electromagnetic field simulator according to claim 1, wherein the second computational formula is obtained by modifying a calculation method for finding an intermediate value between preceding and subsequent time steps.

7. The electromagnetic field simulator according to claim 6, wherein the second computational formula is a computational formula using a value obtained by semi-integral step advancing the intermediate value between preceding and subsequent time steps.

8. The electromagnetic field simulator according to claim 2, wherein the second computational formula is obtained by modifying a calculation method for finding an intermediate value between preceding and subsequent time steps.

9. The electromagnetic field simulator according to claim 8, wherein the second computational formula is a computational formula using a value obtained by semi-integral step advancing the intermediate value between preceding and subsequent time steps.

10. The electromagnetic field simulator according to claim 1, further comprising:
a wavelength computation unit to compute a wavelength of the electromagnetic wave inside the substance when the electromagnetic wave is transmitted through the substance, based on the wave source that is set by the wave source setting unit, wherein the polarization calculation unit switches from the first computational formula to the second computational formula when a grid spacing indicating the sampling resolution of the space that is set by the coefficients setting unit is sufficiently larger than the wavelength inside the substance, which is computed by the wavelength computation unit.

11. The electromagnetic field simulator according to claim 10, wherein the polarization calculation unit switches from the first computational formula to the second computational formula when the grid spacing is equal to or more than "1/10" of the wavelength inside the substance.

12. The electromagnetic field simulator according to claim 2, further comprising:
a wavelength computation unit to compute a wavelength of the electromagnetic wave inside the substance when the electromagnetic wave is transmitted through the substance, based on the wave source that is set by the wave source setting unit, wherein the polarization calculation unit switches from the first computational formula to the second computational formula when a grid spacing indicating the sampling resolution of the space that is set by the coefficients setting unit is sufficiently larger than the wavelength inside the substance, which is computed by the wavelength computation unit.

13. The electromagnetic field simulator according to claim 12, wherein the polarization calculation unit switches from the first computational formula to the second computational formula when the grid spacing is equal to or more than "1/10" of the wavelength inside the substance.

14. A computer readable storage medium storing an electromagnetic field simulation program for repeatedly calculating a spatial distribution of an electromagnetic field at a point in time (n) by using a spatial distribution of the electromagnetic field at a previous point in time (n−1), the program, when being executed by a computer, causes the computer to perform a method comprising:
setting sampling resolutions of a time and space in a simulation of the electromagnetic field;
setting coefficients for the electromagnetic field calculation in each position on a simulation space;
calculating a spatial distribution of the electromagnetic field and a spatial distribution of a polarization current inside a substance at the point in time (n) by using a spatial distribution of the electromagnetic field and a spatial distribution of the polarization current inside the substance at the previous point in time (n−1) and the coefficients, which are set in the setting the coefficients; and
displaying an analysis result based on the calculated spatial distribution of the electromagnetic field, wherein
the setting the coefficients includes switching from a first computational formula used to calculate the spatial distribution of the polarization current to a second computational formula based on the sampling resolution of the space, and
the calculating calculates the spatial distribution of the polarization current at the point in time (n) using the second computational formula.

* * * * *